United States Patent [19]
Mori et al.

[11] Patent Number: 5,973,034
[45] Date of Patent: *Oct. 26, 1999

[54] (OXIDE OR SULFIDE) POWDER EPOXY (METH) ACRYLATE W/GLASS AND/OR METAL

[75] Inventors: Satoshi Mori, Tokyo; Minoru Yokoshima, Toride, both of Japan

[73] Assignee: Nippon Kayaku Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/722,302

[22] Filed: Sep. 30, 1996

[30] Foreign Application Priority Data

| Oct. 11, 1995 | [JP] | Japan | 7-288194 |
| Nov. 9, 1995 | [JP] | Japan | 7-314890 |
| Jul. 30, 1996 | [JP] | Japan | 8-215960 |
| Jul. 30, 1996 | [JP] | Japan | 8-215961 |

[51] Int. Cl.$^6$ .............. C08K 3/08; C08K 3/22; C08K 3/40; C08L 33/14
[52] U.S. Cl. .......... 523/458; 523/459; 523/466; 525/531
[58] Field of Search .......... 525/255, 256, 525/266, 305, 308, 309, 327, 3, 531; 523/458, 459, 466

[56] References Cited

U.S. PATENT DOCUMENTS

| 3,980,483 | 9/1976 | Nishikubo et al. | 96/115 R |
| 4,072,592 | 2/1978 | Due et al. | 204/159.15 |
| 4,097,350 | 6/1978 | Pastor et al. | 204/159.23 |
| 4,110,184 | 8/1978 | Dart et al. | 523/116 |
| 4,188,449 | 2/1980 | Lu et al. | 428/314 |
| 4,918,150 | 4/1990 | Sakakibara et al. | 525/502 |
| 4,933,259 | 6/1990 | Chihara et al. | 430/280 |
| 4,943,516 | 7/1990 | Kamayachi et al. | 430/280 |
| 4,948,700 | 8/1990 | Maeda et al. | 430/280 |
| 5,009,982 | 4/1991 | Kamayachi et al. | 430/280 |
| 5,049,628 | 9/1991 | Nawata et al. | 525/502 |
| 5,100,767 | 3/1992 | Yanagawa et al. | 430/280 |
| 5,102,702 | 4/1992 | Grundke et al. | 427/444 |
| 5,215,863 | 6/1993 | Nawata et al. | 430/280 |
| 5,218,061 | 6/1993 | Kajiwara et al. | 525/523 |
| 5,319,060 | 6/1994 | Nishikawa et al. | 528/89 |
| 5,538,821 | 7/1996 | Kakinuma et al. | 430/18 |
| 5,539,064 | 7/1996 | Hashimoto et al. | 525/529 |

FOREIGN PATENT DOCUMENTS

| 680 133 | 10/1966 | Belgium . |
| 0 0 81 323 | 6/1983 | European Pat. Off. . |
| 0 235 914 | 9/1987 | European Pat. Off. . |
| 0 306 273 | 3/1989 | European Pat. Off. . |
| 0 346 486 | 12/1989 | European Pat. Off. . |
| 0 362 735 | 4/1990 | European Pat. Off. . |
| 0 539 606 | 6/1993 | European Pat. Off. . |
| 2 399 683 | 3/1979 | France . |
| 2 580 828 | 4/1986 | France . |
| 27 05 612 | 8/1977 | Germany . |
| 38 38 562 | 5/1989 | Germany . |
| 43 16 401 | 11/1994 | Germany . |
| 56-70065 | 6/1981 | Japan . |
| 56-40329 | 9/1981 | Japan . |
| 58-49702 | 3/1983 | Japan . |
| 60-119546 | 6/1985 | Japan . |
| 60-208337 | 10/1985 | Japan . |
| 61-59447 | 3/1986 | Japan . |
| 61-243869 | 10/1986 | Japan . |
| 63-312375 | 12/1988 | Japan . |
| 3-223856 | 10/1991 | Japan . |
| 3-247678 | 11/1991 | Japan . |
| 3-250012 | 11/1991 | Japan . |
| 4-170481 | 6/1992 | Japan . |
| 5-32745 | 2/1993 | Japan . |
| 5-32746 | 2/1993 | Japan . |
| 6-258830 | 9/1994 | Japan . |
| 7-286032 | 10/1995 | Japan . |
| 89/07785 | 8/1989 | WIPO . |

OTHER PUBLICATIONS

WPAT accession No. 81–55808D/31 for Japanese patent no. 56–70065, Tamura Kaken KK, Jun. 1981.
Database WPI; week 9601; Derwent Publications Ltd., London, G.B.; AN 96–00698; XP 2029102.
Chemical Abstracts, vol. 95, No. 20, Nov. 16, 1981; Columbus, Ohio, US; abstract no. 171136q; XP2029101.

*Primary Examiner*—Robert E. Sellers
*Attorney, Agent, or Firm*—Nields, Lemack & Dingman

[57] ABSTRACT

There are provided a resin composition and hardened products thereof for use in resistors, phosphors, conductors, patterns and the like, which can be developed with water or a dilute alkaline aqueous solution, show good pattern accuracy, give small residual organic matter after baking and have excellent adhesiveness. The resin composition which comprises (A) an unsaturated group-containing resin which is an epoxy methacrylate resulting from the reaction of (a) an epoxy resin having at least two epoxy groups in its molecule with (b) a compound having one unsaturated double bond and one carboxyl group in one molecule and (c) a saturated monocarboxylic acid as an optional component, the reaction product epoxy (meth)acrylate being allowed to react with (d) a polybasic acid anhydride as occasion demands, (B) a diluent, (C) a photopolymerization initiator and (D) one or more substances selected from metal powders, metal oxides, metal sulfides or glass.

19 Claims, No Drawings

(OXIDE OR SULFIDE) POWDER EPOXY (METH) ACRYLATE W/GLASS AND/OR METAL

BACKGROUND OF THE INVENTION

This invention relates to a resin composition which is suitably used in a process for the production of resistor patterns, conductor circuit patterns or phosphor patterns, ribs or the like to be used in plasma displays, vacuum fluorescent displays, cathode ray tubes, electronic parts and the like and forms excellent resistor patterns for sending a stable electric current, circuit patterns having excellent conductive property, phosphor patterns, ribs or the like when it is exposed to ultraviolet rays, developed with water or a diluted alkaline aqueous solution and then baked at 400 to 1,000° C., and to films thereof, hardened products thereof and baked moldings thereof.

In the currently known resistors, phosphors, ribs or conductors for circuits for plasma display, resistor patterns, phosphor patterns and rib patterns or conductor circuit patterns are formed by a method in which a resistor paste (prepared by making a resistor into a paste form), a phosphor paste (prepared by making a phosphor into a paste form), a rib paste (prepared by making a material for rib use into a paste form) or a conductor paste (prepared by making a conductive material, such as copper powder, silver powder or the like, into a paste form) is subjected to pattern printing by e.g. a screen printing and then to baking, but they cannot cope with the recent demand for the high density and thin width pattern of resistor patterns, phosphor patterns, rib patterns or conductor circuit patterns. Because of this,, development of a photoprocess has been examined making use of photopolymers, but having a difficulty in obtaining high sensitivity.

By resolving the aforementioned problems, the present invention provides a resin composition from which thin width patterns can be prepared with high sensitivity, so that it forms excellent resistor patterns, phosphor patterns, rib patterns or conductor circuit patterns when it is hardened with ultraviolet rays and then developed with water or an alkaline aqueous solution.

SUMMARY OF THE INVENTION

The present invention relates to a resin composition which comprises (A) an unsaturated group-containing resin resulting from the reaction of (a) an epoxy resin having at least two epoxy groups in its molecule with (b) a compound having one unsaturated double bond and one carboxyl group in one molecule and (c) a saturated monocarboxylic acid as an optional component, the reaction product epoxy (meth) acrylate being allowed to react with (d) a polybasic acid anhydride such as polycarboxylic acid anhydride as occasion demands, (B) a diluent, (C) a photopolymerization initiator and (D) one or more substances selected from metal powders, metal oxides, metal sulfides or glass (ethylenically unsaturated bonds may be allowed to exist on their surfaces), to the aforementioned resin composition which is used in a resistor pattern, a conductor pattern, a phosphor pattern or a rib pattern, to a film which comprises the aforementioned resin composition, to a hardened product of the aforementioned resin composition and to a resistor, a conductor, a phosphor or a rib obtained by baking the aforementioned hardened product.

DETAILED DESCRIPTION OF THE INVENTION

The following describes the present invention in detail.

The resin (A) to be used in the present invention is a resin which is obtained by reacting (a) an epoxy resin having two or more epoxy groups in one molecule with (b) a compound having one unsaturated double bond and one carboxyl group in one molecule and with (c) a saturated monocarboxylic acid as an optional component, if necessary by further allowing the reaction product to react with (d) a polybasic acid anhydride.

Illustrative examples of the compound (a) which has two or more epoxy groups in one molecule include a bisphenol A type epoxy resin (for example, Epikote 828, Epikote 1001, Epikote 1002 or Epikote 1004 manufactured by Yuka-Shell Epoxy Co.), an epoxy resin obtained by the reaction of alcoholic hydroxyl groups of a bisphenol A type epoxy resin with epichlorohydrin (for example, NER-1302 manufactured by Nippon Kayaku Co.; epoxy equivalent, 323; softening point, 76° C.), a bisphenol F type resin (for example, Epikote 807, EP-4001, EP-4002 or EP-4004 manufactured by Yuka-Shell Epoxy Co.), an epoxy resin obtained by the reaction of alcoholic hydroxyl groups of a bisphenol F type epoxy resin with epichlorohydrin (for example, NER-7406 manufactured by Nippon Kayaku Co.; epoxy equivalent, 350; softening point, 66° C.), a bisphenol S type epoxy resin, biphenyl glycidyl ether (for example, YX-4000 manufactured by Yuka-Shell Epoxy Co.), a phenol novolak type epoxy resin (for example, EPPN-201 manufactured by Nippon Kayaku Co., EP-152 or EP-154 manufactured by Yuka-Shell Epoxy Co. or DEN-438 manufactured by Dow Chemical Co.), a cresol novolak type epoxy resin (for example, EOCN-102S, EOCN-1020 or EOCN-104S manufactured by Nippon Kayaku Co.), a triglycidyl isocyanurate (TEPIC manufactured by Nissan Chemical Industries Co.), a trisphenolmethane type epoxy resin (EPPN-501, EPN-502 or EPPN-503 manufactured by Nippon Kayaku Co.), a fluorene epoxy resin (for example, Cardoepoxy Resin ESF-300 manufactured by Nippon Steel Chemical Co.), an alicyclic epoxy resin (Celoxide 2021P or Celoxide EHPE manufactured by DAICEL Chemical Industries Co.) and the like.

Another examples of the compound (a) include copolymerization type epoxy resins.

An example of the copolymerization type epoxy resin is a copolymer which is obtained by allowing one or more epoxy monomers selected from glycidyl (meth)acrylate, methyl(meth)acryloylcyclohexene oxide, vinylcyclohexene oxide and/or the like compound to react with one or more monofunctional ethylenically unsaturated group-containing compounds other than the above epoxy monomers, which may be selected from methyl (meth) acrylate, ethyl (meth) acrylate, butyl (meth)acrylate, 2-hydroxyethyl acrylate, 2-hydroxypropyl (meth)acrylate, (meth)acrylic acid, styrene, phenoxyethyl (meth)acrylate, benzyl (meth) acrylate, α-methylstyrene, glycerol mono(meth)acrylate and a compound represented by the general formula (1)

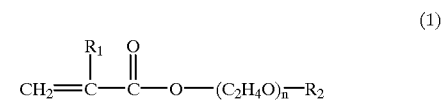

(1)

(wherein $R_1$ is hydrogen or methyl group, $R_2$ is hydrogen or a $C_1$–$C_6$ alkyl group and n is an integer of 2 to 23). Illustrative examples of the compound of formula (1) include polyethylene glycol mono(meth)acrylate such as diethylene glycol mono(meth)acrylate, triethylene glycol mono(meth)acrylate, tetraethylene glycol mono(meth) acrylate, and alkoxypolyethylene glycol (meth)acrylate, such as methoxydiethylene glycol mono(meth)acrylate, methoxytriethylene glycol mono(meth)acrylate, methoxytetraethylene glycol mono(meth)acrylate.

Its illustrative examples of compound (a)include CP-15, CP-30, CP-50, CP-20SA, CP-510SA, CP-50S, CP-50M and CP-20MA which are manufactured by Nippon Oil & Fats Co..

Preferably, the aforementioned copolymerization type epoxy resin may have a molecular weight of approximately from 1,000 to 200,000.

The above epoxy monomer may be used in an amount of preferably from 10 to 70% by weight, more preferably from 20 to 50% by weight, based on the total amount of unsaturated monomers to be used in the copolymerization type epoxy resin.

When a copolymerization type epoxy resin capable of development with water is obtained, it is desirable to use glycerol mono(meth)acrylate and/or the compound of formula (1) in an amount of preferably 30% by weight or more, more preferably 50% by weight or more, based on the total amount of unsaturated monomers to be used in the polymer.

The aforementioned copolymerization type epoxy resin can be obtained by a known polymerization method such as solution polymerization, emulsion polymerization or the like. When solution polymerization is employed, a mixture of ethylenically unsaturated monomers is polymerized by stirring and heating the mixture in an appropriate organic solvent preferably at 50 to 100° C., in the presence of a polymerization under a stream of nitrogen. Illustrative examples of the just described organic solvent include alcohols such as ethanol, propanol, isopropanol, butanol, isobutanol, 2-butanol, hexanol, ethylene glycol and the like, ketones such as methyl ethyl ketone, cyclohexanone and the like, aromatic hydrocarbons such as toluene, xylene and the like, Cellosolves such as Cellosolve, butyl Cellosolve and the like, carbitols such as carbitol, butylcarbitol and the like, propylene glycol alkyl ethers such as propylene glycol methyl ether and the like, polypropylene glycol alkyl ethers such as dipropylene glycol methyl ether and the like, acetic acid esters such as ethyl acetate, butyl acetate, Cellosolve acetate, propylene glycol monomethyl ether acetate and the like, lactic acid esters such as ethyl lactate, butyl lactate and the like and dialkyl glycol ethers and the like. These organic solvents may be used alone or as a mixture thereof.

As the polymerization initiator, a peroxide such as benzoyl peroxide or the like or an azo compound such as azobisisobutyronitrile or the like may be used.

Examples of the compound (b) having one unsaturated double bond and one carboxyl group in one molecule include (meth)acrylic acid or half esters which are reaction products of hydroxyl group-containing (meth)acrylate (for example, 2-hydroxyethyl (meth)acrylate, 2-hydroxypropyl (meth)acrylate, 1,4-butanediol mono(meth)acrylate or the like) with an acid anhydride of a polycarboxylic acid compound (for example, succinic anhydride, maleic anhydride, phthalic anhydride, tetrahydrophthalic anhydride, hexahydrophthalic anhydride or the like).

Illustrative examples of the saturated monocarboxylic acid (c) include acetic acid, propionic acid, pivalic acid, hydroxypivalic acid, dimethylolpropionic acid, benzoic acid, hydroxybenzoic acid and the like.

It is desirable to react 0.5 to 1.1 equivalents of the compound (b) and the saturated monocarboxylic acid (c) as an optional component with 1 equivalent of epoxy group of the aforementioned epoxy resin (a). A reaction solvent may be used as occasion demands, and its examples include alcohols such as ethanol, propanol, isopropanol, butanol, isobutanol, 2-butanol, hexanol, ethylene glycol and the like, ketones such as methyl ethyl ketone, cyclohexanone and the like, aromatic hydrocarbons such as toluene, xylene and the like, Cellosolves such as Cellosolve, butyl Cellosolve and the like, carbitols such as carbitol, butylcarbitol and the like, propylene glycol alkyl ethers such as propylene glycol methyl ether and the like, poly propylene glycol alkyl ethers such as dipropylene glycol methyl ether and the like, acetic acid esters such as ethyl acetate, butyl acetate, Cellosolve acetate, propylene glycol monomethyl acetate and the like, lactic acid esters such as ethyl lactate, butyl lactate and the like and dialkyl glycol ethers and the like. These organic solvents may be used alone or as a mixture thereof.

In order to accelerate the reaction, it is desirable to add 0.1 to 1% of a basic compound as a reaction catalyst to the reaction solution, such as triphenylphosphine, triphenylstibine, triethylamine, triethanolamine, tetramethylammonium chloride, benzyltriethylammonium chloride or the like. In order to prevent polymerization during the reaction, it is desirable to add 0.05 to 0.5% of a polymerization inhibitor (for example, methoxyphenol, methylhydroquinone, hydroquinone, phenothiazine or the like) to the reaction solution. Preferably, the reaction may be carried out at a temperature of from 90 to 150° C. for a period of from 5 to 40 hours.

As occasion demands, the acid anhydride (d) of polybasic acid compound (for example, anhydride of polycarboxylic acid such as succinic anhydride, maleic anhydride, phthalic anhydride, tetrahydrophthalic anhydride or hexahydrophthalic anhydride) may be reacted with the thus obtained epoxy (meth) acrylate, in an amount of 0.2 to 1.0 equivalent of the anhydride group per 1 equivalent of the hydroxyl group of the epoxy(meth)acrylate. Preferably, the reaction may be carried out at a temperature of from 90 to 150° C. for a period of from 3 to 30 hours.

A preferable resin (A) is one represented by the formula (2) or (3).

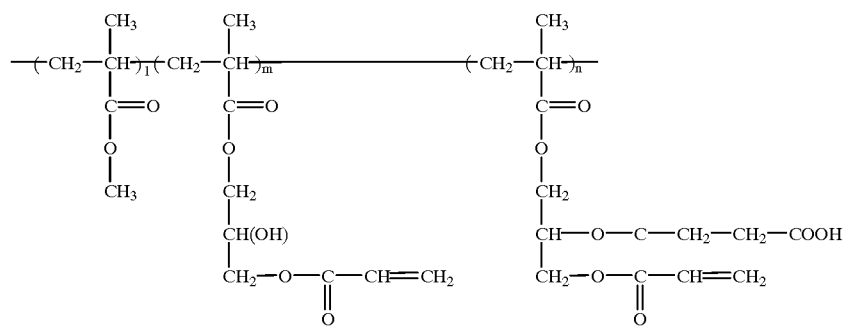

(wherein l=0.1–0.9, m=0.1–0.9, and n=0.1–0.9, and the total of l, m and n is equal to 1)

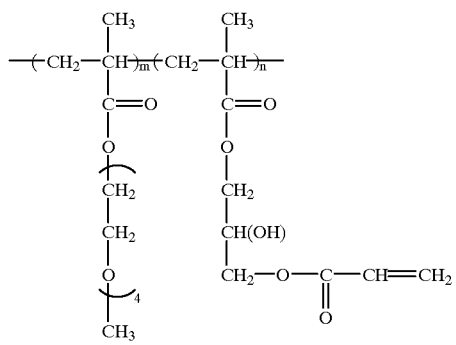

(3)

(wherein m=0.1–0.9 and n=0.1–0.9, and the total of l, m and n is equal to 1)

The diluent (B) is used in the present invention. Illustrative examples of the component (B) include reactive diluents (B-1) such as 2-hydroxyethyl (meth)acrylate, 2-hydroxypropyl (meth)acrylate, 1,4-butanediol mono (meth)acrylate, carbitol (meth)acrylate, acryloylmorpholine, a half ester as a reaction product of a hydroxyl group-containing (meth)acrylate (for example, 2-hydroxyethyl (meth)acrylate, 2-hydroxypropyl (meth)acrylate, 1,4-butanediol mono(meth)acrylate or the like) with an acid anhydride of a polycarboxylic acid compound (for example, succinic anhydride, maleic anhydride, phthalic anhydride, tetrahydrophthalic anhydride, hexahydrophthalic anhydride or the like), polyethylene glycol di(meth)acrylate, tripropylene glycol di(meth)acrylate, trimethylolpropane tri(meth)acrylate, trimethylolpropanepolyethoxy tri(meth)acrylate, glycerolpolypropoxy tri(meth)acrylate, a di(meth)acrylate of ε-caprolactone adduct with neopentyl glycol hydroxypivalate (for example, KAYARAD HX-220 or HX-620 manufactured by Nippon Kayaku Co.), pentaerythritol tetra(meth) acrylate, a poly(meth)acrylate of a reaction product of dipentaerythritol with ε-caprolactone, dipentaerythritol poly (meth)acrylate and an epoxy (meth)acrylate as a reaction product of a mono- or polyglycidyl compound (for example, butyl glycidyl ether, phenyl glycidyl ether, polyethylene glycol diglycidyl ether, polypropylene glycol diglycidyl ether, 1, 6-hexanediol diglycidyl ether, hexahydrophthalic acid diglycidyl ester, glycerolpolyglycidyl ether, glycerolpolyethoxy glycidyl ether, trimethylolpropane polyglycidyl ether, trimethylolpropanepolyethoxy polyglycidyl ether or the like) with (meth)acrylic acid, and organic solvents (B-2) such as ethylene glycol monoalkyl ethers, ethylene glycol dialkyl ethers, diethylene glycol monoalkyl ether acetates, ethylene glycol monoaryl ethers, polyethylene glycol monoaryl ethers, ketones such as acetone, methyl ethyl ketone, methyl isobutyl ketone and the like, esters such as ethyl acetate, butyl acetate and the like, aromatic hydrocarbons such as toluene, xylene, benzyl alcohol and the like, propylene glycol monoalkyl ethers, dipropylene glycol dialkyl ethers, propylene glycol monoalkyl ether acetates, ethylene carbonate, propylene carbonate, γ-butyrolactone, solvent naphtha and the like. These diluents may be used alone or as a mixture of two or more.

Illustrative examples of the photopolymerization initiator (C) include 2,4-diethylthioxanthone, 2-chlorothioxanthone, isopropylthioxanthone, 2-methyl-1-[4-(methylthio)phenyl]-2-morpholino-propane-1,2-benzyl-2-dimethylamino-1-(4-morpholinophenyl) -1-butanone, 4-benzoyl-4'-methyldiphenyl sulfide, 2,4,6-trimethylbenzoyldiphenylphosphine oxide, Michler's ketone, benzyldimethylketal, 2-ethylanthraquinone and the like. In addition, photopolymerization accelerating agents (for example, N,N-dimethylaminobenzoic acid ethyl ester, N,N-dimethylaminobenzoic acid isoamyl ester and the like amines) may be jointly used as an accelerator of these photopolymerization initiators (C).

Illustrative examples of the metal powder, metal oxide powder, metal sulfide powder and/or glass powder to be used in the present invention as components of the powder (D), preferably having a particle size of 10 μm or less, include metal oxides such as ruthenium oxide, yttrium oxide, europium oxide, samarium oxide, cerium oxide, lanthanum oxide, praseodymium oxide, neodymium oxide, gadolinium oxide, terbium oxide, dysprosium oxide, holmium oxide, erbium oxide, thulium oxide, $Y_2O_3$:Eu, $YVO_4$:Eu, (Y,Gd)$BO_3$:Eu, $BaAl_{12}O_{19}$:Mn, $Zn_2SiO_4$:Mn, $BaMgAl_{14}O_{23}$:Eu, $BaMgAl_{16}O_{27}$:Eu, MgO, $LaB_6$, Al, $La_{0.5}Sr_{0.5}CoO_3$, $La_{0.7}Sr_{0.3}$:$MnO_3$ and the like, metal sulfides such as (Zn, Cd)S:Ag, (Zn,Cd)S:Cu and the like, metal powders such as copper powder, silver powder, palladium powder, mixture powder of silver and palladium and surface treated gold powder, as well as powders of lanthanum, cerium, samarium, praseodymium, neodymium, promethium, europium, gadolinium, terbium, dysprosium, holmium, thulium, erbium, ruthenium, yttrium, scandium and the like or mixtures thereof, and glass powder, glass beads and the like. Depend on the characteristics of these components, the resin composition can be applied for example to a composition for resistor, a composition for conductor circuit, a composition for phosphor and a composition for rib.

The powder (D) to be used in the present invention can also be obtained by introducing (allowing to exist) ethylenically unsaturated bonds into the surface of the aforementioned powder components. Though not particularly limited, introduction of these ethylenically unsaturated bonds may be effected preferably by a method in which the powder is treated with a coupling agent having ethylenically unsaturated bonds or a method in which the powder is coated with a polymer having ethylenically unsaturated bonds.

The method in which the powder is treated with a coupling agent having ethylenically unsaturated bonds is described. Though the coupling agent having ethylenically unsaturated bonds is not particularly limited, examples of silane coupling agents include vinyltrimethoxysilane, vinyltris(β-methoxyethoxy)silane, vinyltriethoxysilane, vinyltrimethoxysilane, γ-methacryloxypropyltrimethoxysilane and vinylacetoxysilane, as well as β-(3,4-epoxycyclohexyl) ethyltrimethoxysilane, γ-glycidoxypropylmethyldiethoxysilane, or a reaction product of γ-glycidoxypropylmethyldiethoxysilane or the like epoxy group-containing coupling agent with (meth) acrylic acid or the like carboxyl group-containing (meth)acrylate, or a reaction product of isocyanopropyltrimethoxysilane, isocyanopropyltriethoxysilane or the like isocyanate group-containing coupling agent with 2-hydroxyethyl (meth) acrylate or the like hydroxyl group-containing (meth) acrylate. Of these coupling agents, vinyl-based or (meth) acryl-based compounds are preferred.

Though not particularly limited, treatment of the powder with a coupling agent may be effected by a dry method (the powder is thoroughly mixed using a V type mixer, Henschel mixer or the like, sprayed with an aqueous solution of a silane coupling agent and then dried), a wet method (the powder is dispersed in water or an organic solvent, and the resulting slurry is mixed with a silane coupling agent while stirring and then dehydrated and dried) or a spray method(an aqueous solution of a silane coupling agent is sprayed to the powder which is heated to a high temperature). The silane coupling agent may be used in an amount of preferably from 0.5 to 2% by weight based on the powder to be treated.

With regard to the method in which the powder is coated with a polymer having ethylenically unsaturated bonds, the polymer to be used is not particularly limited, and its examples include ethylenically unsaturated bond-containing acrylic resin, urethane resin, epoxy resin, polyester resin, polyether resin, polyamide resin, polyimide resin, polysulfide resin, melamine resin, cellulose resin, chitin, chitosan, gelatin and the like.

Examples of the coating method of these polymers include pan coating method, hybridization method, mechanical fusion method, heat seal method, solvent melting method, spray drying method, coacervation method, surface polymerization method, in situ method and the like. Preferably, these polymer layers may have a thickness of from 0.001 to 0.1 μm.

The resin composition of the present invention can be prepared by dissolving, mixing and kneading the components (A), (B), (C) and (D). Amount of each component to be used in the resin composition of the present invention can be defined as follows (% means % by weight).

Total amount of (A)+(B-1)+(C) to be used is preferably from 5 to 60%, more preferably from 10 to 50%, based on the composition. Amount of the component (D) in the composition is preferably from 40 to 95%, more preferably from 50 to 90%. With regard to preferred amounts of respective components based on the total amount of (A)+(B-1)+(C), amount of the component (A) to be used is 30 to 90%, amount of the component (B-1) to be used is 5 to 65% and amount of the component (C) to be used is 5 to 30%. The organic solvent (B-2) can be used in any amount, in order to adjust viscosity and the like to suitable levels for use of the composition of the present invention.

The component (A) as an important composing ingredient of the present invention is obtained preferably by reacting the following compounds (a), (b), (c) and (d) as described in the foregoing.

Compound (a) is a copolymerization type epoxy resin which is obtained by allowing one or more epoxy monomers such as glycidyl (meth)acrylate mentioned above to react with one or more monofunctional ethylenically unsaturated group-containing compounds selected from methyl (meth) acrylate, ethyl (meth)acrylate, butyl (meth)acrylate, 2-hydroxyethyl acrylate, 2-hydroxypropyl (meth)acrylate, (meth)acrylic acid, styrene, phenoxyethyl (meth)acrylate, benzyl (meth)acrylate, α-methylstyrene, glycerol mono (meth)acrylate and a compound represented by the general formula (1)

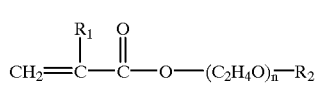

(1)

(wherein $R_1$ is hydrogen or methyl group, $R_2$ is hydrogen or a $C_1$–$C_6$ alkyl group and n is an integer of 2 to 23), (b) is one or more compounds selected from (meth)acrylate and half esters as reaction products of a hydroxyl group-containing (meth)acrylate (for example, 2-hydroxyethyl (meth) acrylate, 2-hydroxypropyl (meth)acrylate, 1,4-butanediol mono(meth)acrylate or the like) with an acid anhydride of a polycarboxylic acid compound (for example, succinic anhydride, maleic anhydride, phthalic anhydride, tetrahydrophthalic anhydride, hexahydrophthalic anhydride or the like), (c) is one or more compounds selected from acetic acid, propionic acid, pivalic acid, hydroxypivalic acid, dimethylolpropionic acid, benzoic acid and hydroxybenzoic acid, and (d) is one or more compounds selected from succinic anhydride, maleic anhydride, phthalic anhydride, tetrahydrophthalic anhydride and hexahydrophthalic anhydride.

In the resin composition of the present invention, a leveling agent, an antifoaming agent, a coupling agent, a polymerization inhibitor, waxes and the like may be used within such a range that performance of the composition is not spoiled.

The resin composition of the present invention can be applied to a composition for resistors, a composition for phosphors, a composition for ribs and a composition for conductor circuits as described in the foregoing, and these compositions are coated on the entire surface of various substrates (for example, glass, ceramics, metals and the like) by screen printing, curtain flow coating, spray coating and the like means. After the coating, organic solvent is removed by pre-baking the coat film approximately at 50 to 250° C. with far infrared radiation or hot air as occasion demands and then the resulting film is exposed to ultraviolet rays using a negative mask which permits passing ultraviolet rays only at portions required for patterning. Exposure amounts of ultraviolet rays are preferably from 10 to 10,000 mJ/cm². Next, development is carried out for example by spraying water or a dilute alkaline aqueous solution having a temperature of preferably 10 to 60° C. and then the pattern of interest is formed for example by carrying out 1 to 24 hours of baking at 400 to 1,000° C.

Alternatively, when used as a film, the resin composition of the present invention is coated for example on a separator film, making use of wire bar, dipping, spin coating, gravure, doctor blade or the like means, dried at 50 to 250° C. with far infrared radiation or hot air as occasion demands and then, as occasion demands, another separator film is applied thereto. Upon use, the separator film is peeled off and the film is transferred on a substrate and then a pattern is formed by carrying out exposure, development and baking in the same manner as described above.

Examples

The following describes the present invention with reference to Examples 1 to 13. In Examples, part means weight part.

Resin compositions for use in resistors, phosphors and ribs were prepared in accordance with the compositions shown in Tables 1 to 3. Each of the thus obtained resin compositions was applied to on the entire surface of a glass substrate to a film thickness (dried film thickness) of 130 μm using a guide, pre-baked at 80° C. for 30 minutes, contacted with a negative film (line/space=150 μm/150 μm) and exposed to 1,500 mJ/cm² of radiation using a high pressure mercury lamp, and then the unexposed portions were developed for 2 minutes using a developing solution (40° C.) at a spray pressure of 2 kg/cm². After completion of the development, rib and phosphor patterns were formed by 1 hour of baking at 500° C. in air. Thereafter, residual resin contents in each pattern, developability, conditions of each pattern after development and adhesiveness with the glass substrate after baking were evaluated.

SYNTHESIS EXAMPLE 1

(Synthesis example of reactant A)

A round bottom flask equipped with a stirrer and a condenser tube was charged with 200 parts of a trisphenolmethane type epoxy resin (EPPN-503 manufactured by Nippon Kayaku Co.; epoxy equivalent, 200; softening point, 83° C.), 72 parts of acrylic acid, 0.2 part of methylhydroquinone and 169.1 parts of propylene glycol monomethyl ether acetate, and the contents were dissolved by heating at 90° C. Next, the flask was cooled down to 60° C. and charged with 1.2 parts of triphenylphosphine to carry out 32 hours of reaction at 95°0 C. and then charged with 112.6 parts of tetrahydrophthalic acid anhydride to carry out 15 hours of reaction at 95° C., thereby obtaining an unsaturated group-containing resin having an acid value (mg KOH/g) of solids of 100.

SYNTHESIS EXAMPLE 2

(Synthesis example of reactant (A))

A round bottom flask equipped with a stirrer and a condenser tube was charged with 310 parts of a copolymerization type epoxy resin (Blenmer-CP-50M manufactured by Nippon Oil & Fats Co.; epoxy equivalent, 310; average molecular weight, 6,000), 72 parts of acrylic acid, 0.3 part of methylhydroquinone and 244.5 parts of propylene glycol monomethyl ether acetate, and the contents were dissolved by heating at 60° C. Next, the flask was charged with 1.8 parts of triphenylphosphine to carry out 32 hours of reaction at 95° C. and then charged with 70 parts of succinic anhydride to carry out 15 hours of reaction at 95° C., thereby obtaining an unsaturated group-containing resin having an acid value (mg KOH/g) of solids of 80 and represented by the formula:

SYNTHESIS EXAMPLE 3

(Synthesis examples of reactant (A))

A mixture consisting of 70 parts of glycerol methacrylate, 30 parts of glycidyl methacrylate, 100 parts of carbitol acetate and 3 parts of benzoyl peroxide was heated under a stream of nitrogen to carry out 5 hours of polymerization at 75° C., thereby obtaining a 50% polymer solution. Next, 22.8 parts of acrylic acid, 0.16 part of methylhydroquinone, 0.9 part of triphenylphosphine and 250 parts of carbitol acetate were mixed with 300 parts of the 50% polymer solution and dissolved therein, subsequently carrying out 32 hours of reaction at 95° C. to obtain a reaction product solution. Average molecular weight of the product was about 50,000.

SYNTHESIS EXAMPLE 4

A mixture consisting of 50 parts of tetraethylene glycol monomethacrylate, 25 parts of glycidyl methacrylate, 25 parts of methy methacrylate, 100 parts of propylene glycol monomethyl ether acetate and 2 parts of azobisisobutyronitrile was heated under a stream of nitrogen to carry out 5 hours of polymerization at 75° C., thereby obtaining a 50% polymer solution. Next, 19 parts of acrylic acid, 0.16 part of methylhydroquinone, 0.9 part of triphenylphosphine and 250 parts of carbitol acetate were mixed with 300 parts of the 50% polymer solution and dissolved therein, subsequently carrying out 32 hours of reaction at 95° C. to obtain a reaction product solution. Average molecular weight of the product was about 80,000.

SYNTHESIS EXAMPLE 5

A mixture consisting of 70 parts of methoxytetraethylene glycol monomethacrylate, 30 parts of glycidyl methacrylate, 100 parts of carbitol acetate and 3 parts of benzoyl peroxide was heated under a stream of nitrogen to carry out 5 hours of polymerization at 75° C., thereby obtaining a 50% polymer solution. Next, 22.8 parts of acrylic acid, 0.16 part of methylhydroquinone, 0.9 part of triphenylphosphine and 250 parts of carbitol acetate were mixed with 300 parts of the 50% polymer solution and dissolved therein, subsequently carrying out 32 hours of reaction at 95° C. to obtain a reaction product solution containing the compound of the formula:

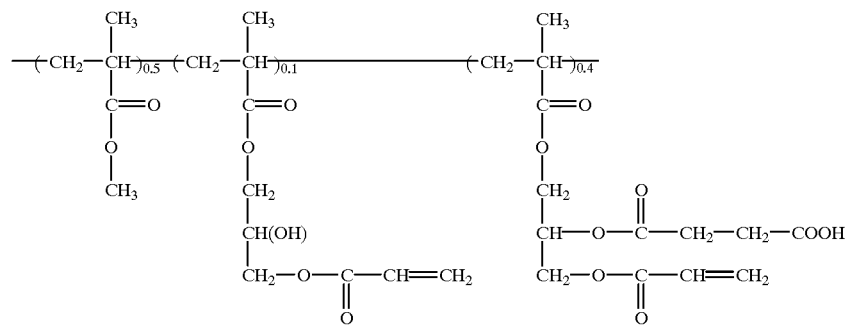

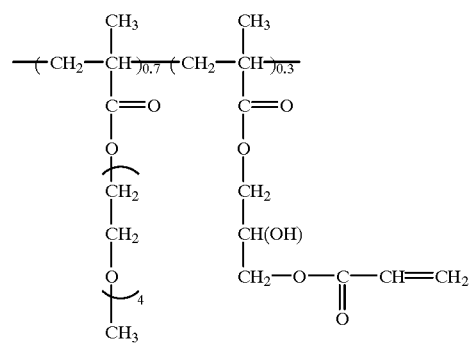

Average molecular weight of the product was about 30,000.

PREPARATION EXAMPLE 1

(Preparation example of powder (D))

An aqueous solution of a silane coupling agent was obtained by dissolving 1 part of γ-methacryloxypropyltrimethoxysilane and 0.05 part of acetic acid in 100 parts of water. The thus obtained silane coupling agent aqueous solution was sprayed to 100 parts of low-melting glass powder having an average particle size of 5 μm which was heated at 100° C. and thoroughly stirred, and the resulting powder was dried at 100° C. for 5 hours, thereby obtaining low melting point glass powder having ethylenically unsaturated bonds on the surface.

PREPARATION EXAMPLE 2

(Preparation example of powder (D))

Five parts of sodium salt of the resin obtained in Synthesis Example 2 was dissolved in 100 parts of water, and 100 parts of low melting point glass powder having an average particle size of 5 μm was dispersed in the resulting solution. Thereafter, the dispersion was dried using a spray dryer to obtain low melting glass powder having ethylenically unsaturated bonds on the surface.

TABLE 1

|  | Example 1 | Example 2 | Example 3 | Example 4 |
|---|---|---|---|---|
| Polymer obtained in Synthesis Example 1 | 15.4 | 15.4 | | 7.7 |
| Polymer obtained in Synthesis Example 2 | | | 15.4 | 7.7 |
| KAYARAD PEG400DA *1 | 7 | 5 | 5 | |
| KAYARAD DPHA *2 | | 2 | | |
| KAYARAD DPCA-60 *3 | | | 2 | 7 |
| KAYACURE DETX-S *4 | 2 | 2 | 2 | 2 |
| KAYACURE EPA *5 | 2 | 2 | 2 | 2 |
| Mixture powder of ruthenium oxide and glass | 40 | | 40 | 40 |
| Glass beads | | 40 | | |
| Propylene glycol monomethyl ether acetate | 35 | 35 | 35 | 35 |
| Residual organic matter (wt %) | 0.1 | 0.1 | 0.05 | 0.05 |
| Developability (1% sodium carbonate aqueous solution) | ◯ | ◯ | ◯ | ◯ |
| Condition of pattern after development | ◯ | ◯ | ◯ | ◯ |
| Adhesiveness | ◯ | ◯ | ◯ | ◯ |

TABLE 2

|  | Example 5 | Example 6 | Example 7 | Example 8 |
|---|---|---|---|---|
| Polymer obtained in Synthesis Example 3 | 22.7 | | 17.0 | |
| Polymer obtained in Synthesis Example 4 | | 22.8 | | |
| Polymer obtained in Synthesis Example 5 | | | | 20.0 |
| Diacrylate of tetraethylene glycol diglycidyl ether | 2 | 2 | 11 | 8 |
| KAYARAD PEG400DA | 7 | 5 | | |
| KAYARAD DPHA | | 2 | | |
| KAYACURE DETX-S | 2 | 2 | 2 | 2 |
| KAYACURE EPA | 2 | 2 | 2 | 2 |
| Mixture powder of ruthenium oxide and glass | 30 | 30 | 30 | 30 |
| Propylene glycol monomethyl ether acetate | 37 | 37 | 39 | 38 |
| Residual organic matter (wt %) | 0.2 | 0.3 | 0.1 | 0.15 |
| Developability (water) | ◯ | ◯ | ◯ | ◯ |
| Condition of pattern after development | ◯ | ◯ | ◯ | ◯ |
| Adhesiveness | ◯ | ◯ | ◯ | ◯ |

TABLE 3

|  | Example 9 | Example 10 | Example 11 | Example 12 |
|---|---|---|---|---|
| Polymer obtained in Synthesis Example 1 | 20 | | 20 | |
| Polymer obtained in Synthesis Example 5 | | 20 | | 20 |
| KAYARAD THE-330 *6 | 5 | 5 | 5 | 5 |
| Irg-651 *7 | 0.25 | 0.25 | 0.25 | 0.25 |
| Phosphor powder | 30 | 30 | 30 *8 | 30 *9 |
| Residual organic matter (wt %) | 0.1 | 0.1 | 0.1 | 0.1 |
| Developability (1% sodium carbonate aqueous solution) | ◯ | | ◯ | |
| Developability (water) | | ◯ | | ◯ |
| Condition of pattern after development | ◯ | ◯ | ◯ | ◯ |
| Adhesiveness | ◯ | ◯ | ◯ | ◯ |

Note
*1 KAYARAD PEG400DA: polyethylene glycol diacrylate (manufactured by Nippon Kayaku Co.)
*2 KAYARAD DPHA: dipentaerythritol penta- and hexaacrylate (manufactured by Nippon Kayaku Co.)
*3 KAYARAD DPCA-60: caprolactone modified dipentaerythritol hexaacrylate (manufactured by Nippon Kayaku Co.)
*4 KAYACURE DETX-S: 2,4-diethylthioxanthone (manufactured by Nippon Kayaku Co.)
*5 KAYACURE EPA: p-dimethylaminobenzoic acid ethyl ester (manufactured by Nippon Kayaku Co.)
*6 KAYARAD THE-330: EO modified trimethylolpropane triacrylate (manufactured by Nippon Kayaku Co.)
*7 Irg-651: 2,2-dimethoxy-1,2-diphenylethan-1-one (manufactured by Ciba-Geigy Co.)
*8 Powder obtained in Preparation Example 1
*9 Powder obtained in Preparation Example 2

EXAMPLE 13

The resin composition of Example 1 was coated on a separator film in such an amount that the coated layer had a thickness after drying of 130 μm and subsequently dried at 80° C. for 30 minutes. The thus prepared film was transferred on a glass substrate, contacted with a negative film and exposed to 1,500 mJ/cm² of radiation using a high pressure mercury lamp, and then the unexposed portions were developed for 2 minutes using 1% sodium carbonate aqueous solution (40° C.) at a spray pressure of 2 kg/cm². After completion of the development, a rib pattern was formed by 1 hour of baking at 500° C. in air. Thereafter, residual resin contents in the pattern, developability, conditions of the pattern after development and adhesiveness with the glass substrate after baking were evaluated which were all judged as ◯.

(Residual organic matter): Weight loss after 60 minutes of baking at 500° C. was measured.

(Developability): Two minutes of development was carried out using an organic solvent based developing solution at a temperature of 40° C. under a spray pressure of 2 kg/cm², and the results were evaluated based on the following criteria.

◯: Completely developed

Δ: Presence of some residues

X: Presence of portions not developed

—: Partial or entire peeling of pattern (Conditions of pattern after development)

◯: Pattern accurately maintained

Δ: Width of pattern thinned

X: Partial or entire peeling of pattern (Adhesiveness): Cellophane tape peeling test was carried out.

◯: No peeling

Δ: Very slight peeling

X: Many peeled portions

As is evident from the results of Examples 1 to 13, the resin composition of the present invention, films thereof and hardened products thereof are excellent in developability, show good pattern accuracy after development, and have excellent adhesiveness and residual organic matters in patterns after baking are little.

Effect of the Invention

The resin composition of the present invention and films thereof are excellent in developability, show good pattern accuracy after development and have excellent adhesiveness and residual organic matters in patterns even after baking at a low temperature are little, in forming patterns of resistors, phosphors, ribs or conductor circuits by developing the un-exposed portions by exposing the resin compositions and films thereof to ultraviolet rays through a pattern-formed film.

What we claim is:

1. A resin composition for the production of resistors, phosphors, ribs or conductor circuits which comprises (A) an unsaturated group-containing resin which is an epoxy (meth)acrylate resulting from the reaction of (a) a copolymerization epoxy resin derived from the copolymerization of one or more epoxy monomers and one or more monofunctional ethylenically unsaturated group-containing compounds other than the epoxy monomers having at least two epoxy groups in its molecule with (b) a compound having one unsaturated double bond and one carboxyl group in one molecule and (c) a saturated monocarboxylic acid as an optional component, the reaction product epoxy(meth) acrylate being allowed to react with (d) optionally, a polybasic acid anhydride, (B) a diluent, (C) a photopolymerization initiator, (D) glass powder or glass beads, and (E) optionally one or more substances selected from the group consisting of metal powders, metal oxides and metal sulfides, which (D) and (E) optionally has an ethylenically unsaturated bond on their surfaces, and is characterized in that the residual organic matter of said resin composition in patterns of resistors, phosphors, ribs or conductor circuits which are formed by developing the unexposed portions obtained by exposing the resin composition or a film thereof to ultraviolet rays through a pattern-formed film and then baking at a temperature of 400 to 1,000° C. are 0.3% by weight or lower.

2. The resin composition of claim 1 wherein (E) is a metal oxide.

3. The resin composition according to claim 1 wherein (E) is one or more substances selected from the group consisting of metal powders, metal oxides and metal sulfides which have been treated with a coupling agent having an ethylenically unsaturated bond.

4. The resin composition according to claim 3 wherein the coupling agent having an ethylenically unsaturated bond is a vinyl or (meth)acryl compound.

5. The resin composition according to any one of claims 1, 2, 3 or 4 wherein (a) is a copolymerization epoxy resin which is obtained by allowing one or more epoxy monomers selected from the group consisting of glycidyl(meth) acrylate, methyl(meth)acryloylcyclohexene oxide and vinylcyclohexene oxide to react with one or more monofunctional ethylenically unsaturated group-containing compounds selected from the group consisting of methyl (meth)acrylate, ethyl (meth)acrylate, butyl (meth)acrylate, 2-hydroxyethyl acrylate, 2-hydroxylpropyl (meth)acrylate, (meth)acrylic acid, styrene, phenoxyethyl (meth)acrylate, benzyl (meth) acrylate, α-methylstyrene, glycerol mono(meth)acrylate and a compound represented by the general formula (1):

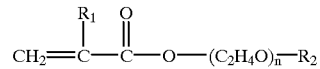

wherein $R_1$ is hydrogen or methyl group, $R_2$ is hydrogen or a $C_1$–$C_6$ alkyl group and n is an integer of 2 to 23, (b) is one or more compounds selected from the group consisting of (meth)acrylic acid and half esters as reaction products of a hydroxyl group-containing (meth)acrylate selected from the group consisting of 2-hydroxyethyl (meth)acrylate, 2-hydroxypropyl (meth)acrylate and 1,4-butanediol mono (meth)acrylate, with an acid anhydride of a polycarboxylic acid compound selected from the group consisting of succinic anhydride, maleic anhydride, phthalic anhydride, tetrahydrophthalic anhydride and hexahydrophthalic anhydride, (c) is one or more compound selected from the group consisting of acetic acid, propionic acid, pivalic acid, hydroxypivalic acid, dimethylolpropionic acid, benzoic acid and hydroxybenzoic acid, and (d) is one or more compounds selected from the group consisting of succinic anhydride, maleic anhydride, phthalic anhydride, tetrahydrophthalic anhydride and hexahydrophthalic anhydride.

6. The resin composition according to any one of claims 1, 2, 3 or 4 wherein (B) is a reactive diluent having an ethylenically unsaturated bond, the total amount of (A)+ (B)+(C) to be used in the resin composition is 5 to 60%, (D) or (D)+(E) is 40 to 95%, and the amounts of respective components relative to the total amount of (A)+(B)+(C) are (A) is 30 to 90%, (B) is 5 to 65% and (C) is 5 to 30%.

7. A film which comprises the resin composition of any one of claims 1, 2, 3 or 4.

8. A hardened product of the resin composition of any one of claims 1, 2, 3 or 4.

9. The resin composition according to claim 5 wherein (B) is a reactive diluent having an ethylenically unsaturated bond, the total amount of (A)+(B)+(C) to be used in the resin composition is 5 to 60%, (D) or (D)+(E) is 40 to 95%, and the amounts of respective components relative to the total amount of (A)+(B)+(C) are (A) is 30 to 90%, (B) is 5 to 65% and (C) is 5 to 30%.

10. A film which comprises the resin composition of 5.

11. A film which comprises the resin composition of 6.

12. A film which comprises the resin composition of claim 9.

13. A hardened product of the resin composition of claim 5.

14. A hardened product of the resin composition of claim 6.

15. A hardened product of the resin composition of claim 7.

16. A hardened product of the resin composition of claim 9.

17. A hardened product of the resin composition of claim 10.

18. A hardened product of the resin composition of claim 11.

19. A hardened product of the resin composition of claim 12.

* * * * *